United States Patent [19]

Seragnoli

[11] 4,254,858
[45] Mar. 10, 1981

[54] VARIABLE CAPACITY RESERVOIR FOR ROD SHAPED ARTICLES, PARTICULARLY CIGARETTES

[75] Inventor: Enzo Seragnoli, Bologna, Italy

[73] Assignee: G. D. Societa per Azioni, Bologna, Italy

[21] Appl. No.: 55,328

[22] Filed: Jul. 6, 1979

[30] Foreign Application Priority Data

Jul. 21, 1978 [IT] Italy .................................. 3501 A/78

[51] Int. Cl.³ ........................ B65G 37/00; B65G 13/02
[52] U.S. Cl. ..................................... 198/347; 198/778
[58] Field of Search ................ 198/347, 750, 778, 756

[56] References Cited

U.S. PATENT DOCUMENTS

| | | | |
|---|---|---|---|
| 3,178,008 | 4/1965 | Solet | 198/347 |
| 3,869,115 | 3/1975 | Barkley | 198/347 |
| 4,099,608 | 7/1978 | McCombie | 198/347 |

FOREIGN PATENT DOCUMENTS

| | | | |
|---|---|---|---|
| 972311 | 8/1975 | Canada | 198/756 |
| 2323266 | 11/1975 | Fed. Rep. of Germany | 198/347 |

*Primary Examiner*—Joseph E. Valenza
*Assistant Examiner*—Brian Bond
*Attorney, Agent, or Firm*—Merriam, Marshall & Bicknell

[57] ABSTRACT

A variable capacity store or reservoir for rod or for shaped articles, particularly cigarettes, in which a fixed support member (8,18) in the form of a screw (20) of substantially vertical axis supports a movable member (26,27,33) in the form of a nut screw coupled to said fixed member (8,18), said movable member supporting a helical wall (54) arranged to support at least one layer of said bar shaped articles disposed facing and radial to said fixed member (8, 18); reversible drive means (43) being provided for rotating said movable member (26,27,33) with respect to said fixed member (8,18); and a loading-unloading station (61) for said bar shaped articles being disposed in a fixed position relative to said fixed member (8,18).

7 Claims, 4 Drawing Figures

VARIABLE CAPACITY RESERVOIR FOR ROD SHAPED ARTICLES, PARTICULARLY CIGARETTES

BACKGROUND OF THE INVENTION

This invention relates to a variable capacity store or reservoir for rod or bar shaped articles, particularly cigarettes.

The store according to the present invention is particularly but not exclusively for use in a feed system for quantities of cigarettes, and is disposed between one or more cigarette forming machines and a packaging machine, for the purpose of compensating any differences existing between the number of cigarettes produced by said forming machines and the number absorbed by said packaging machine.

SUMMARY OF THE INVENTION

The present invention provides a variable capacity store or reservoir for rob or bar shaped articles, particularly cigarettes, comprising a fixed support member in the form of a screw of substantially vertical axis; a movable member in the form of a nut screw coupled to said fixed member, said movable member comprising a helical wall arranged to support at least one layer of said bar shaped articles disposed facing and radial to said fixed member; reversible drive means for rotating said movable member with respect to said fixed member; and a loading-unloading station for said bar shaped articles disposed in a fixed position relative to said fixed member and comprising fixed wall means for supporting said bar shaped elements and slidably coupled to said helical wall.

In a particular preferred embodiment of the present invention, said fixed member comprises a substantially cylindrical member with an external helical groove; said loading-unloading station being disposed facing a determined point of said groove, and said helical wall being constituted by a band wound as a cylindrical helix movable between a position of zero capacity, in which the inner periphery of said band is slidably engaged with a portion of said groove lying between one end thereof and said point facing said loading-unloading station, and a position of maximum capacity in which the inner periphery of said band is slidably engaged with substantially the whole of said helical groove.

Preferably, said helical band is constructed of resilient material, and axial stop means are provided for said band which define, in a position adjacent to said end of said helical groove, an annular compartment arranged to receive in the form of a tight pack those turns of said helical band which have become uncoupled from said helical groove.

BRIEF DESCRIPTION OF THE DRAWINGS

Further characteristics and advantages of the present invention will be apparent from the description given hereinafter with reference to the accompanying drawings, which illustrate a non-limiting embodiment thereof, and in which.

DETAILED DESCRIPTION OF THE INVENTION

Figure 1:
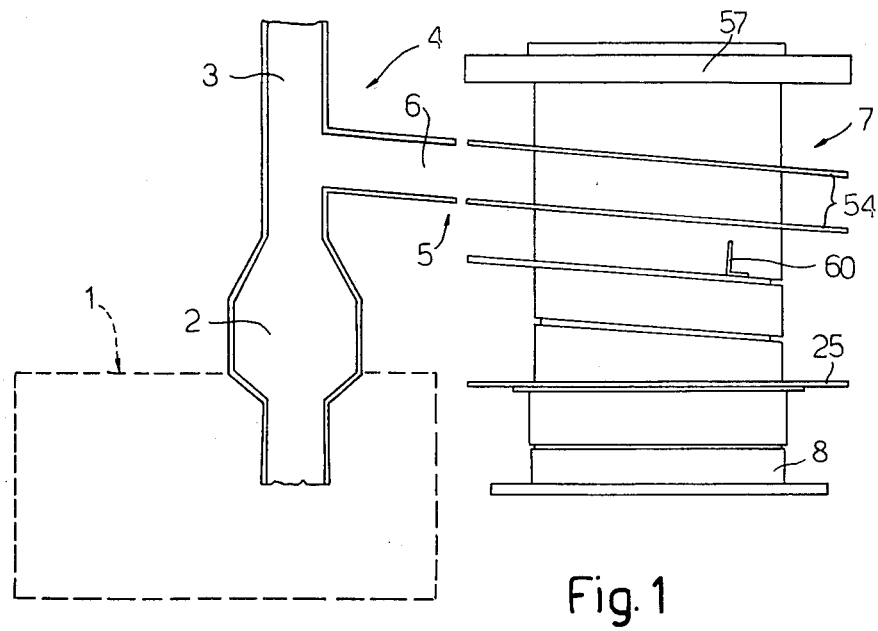
FIG. 1 is a partial diagrammatic elevation of a device for feeding cigarettes to a packaging machine, said device comprising a store or reservoir constructed in accordance with the present invention.

The dashed line in FIG. 1 illustrates diagramma cally the inlet portion of a packaging machine indicate overall by 1 and comprising a hopper 2, to which tl cigarettes, not shown, are fed from above in quanti through a substantially vertical feed channel 3, whic forms the outlet of a feed unit indicated overall by and of which only a part is shown in FIG. 1.

The feed unit 4 is disposed between the packagir machine 1 and one or more cigarette forming machin (not shown), and comprises a storage unit indicate overall by 5, arranged to compensate any differenc between the number of cigarettes produced by sa forming machines and the number absorbed by tl packaging machine 1.

In the embodiment shown in FIG. 1, the storage un 5 comprises an inlet duct 6 connected to the channel and a variable capacity store indicated overall by 7.

Figure 2:
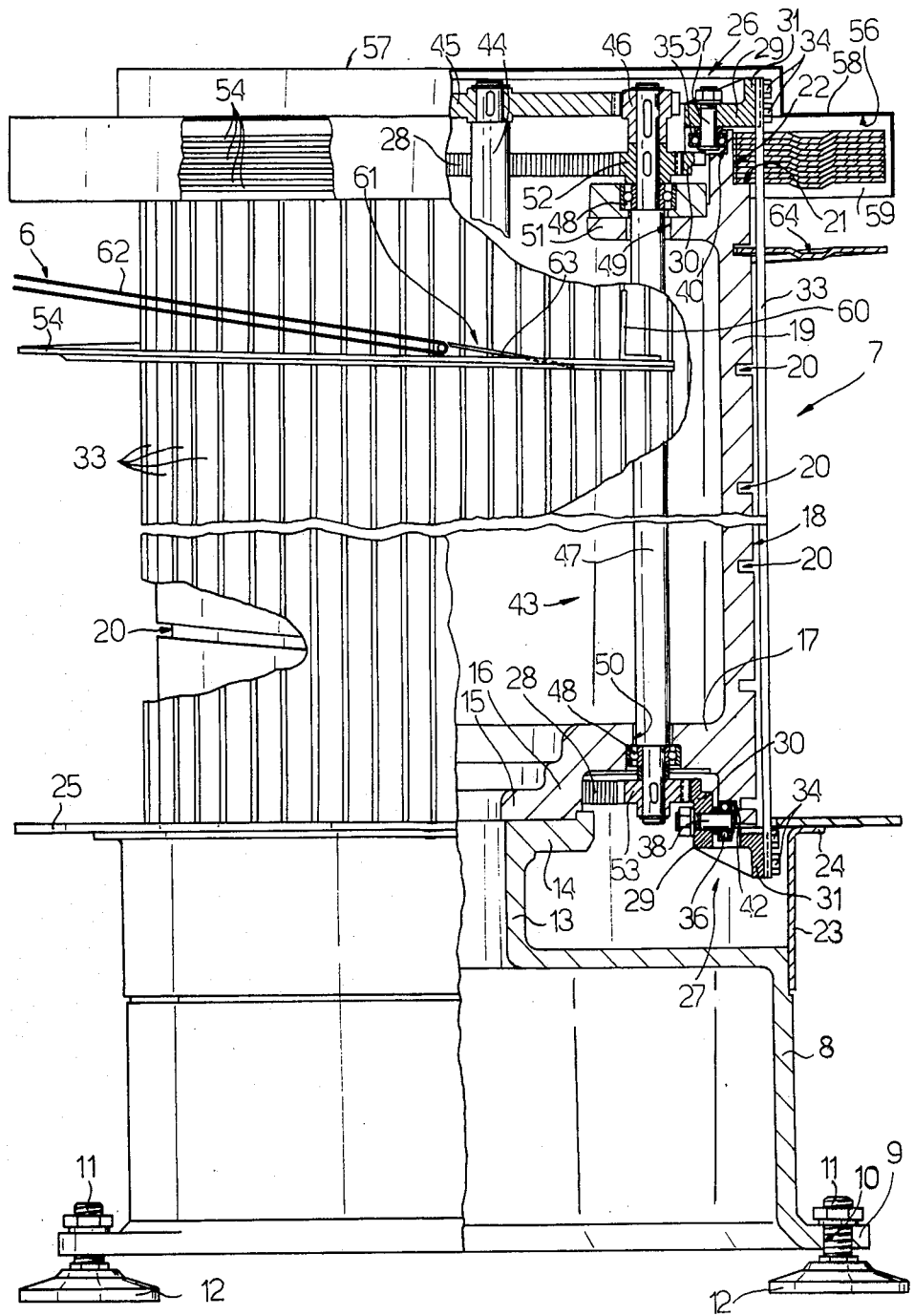
FIG. 2 is an enlarged side elevation, partly in axial section, of the store of FIG. 1.

As shown in FIG. 2, the store or reservoir 7 is sul stantially cylindrical and of vertical axis, and compris a cylindrical pedestal 8 with a lower flange 9 provide with threaded through bores 10 through each of whic a threaded pin 11 of an adjustable foot 12 extends. At i top, the pedestal 8 comprises a tubular appendix 1 provided which a horizontal end flange 14, to whic there is rigidly connected a horizontal flange 15 exten ing inwards from the lower end of a tubular appendix 1 coaxial with the appendix 13.

The tubular appendix 16 extends downwards from horizontal base wall 17 of a cylindrical drum 18 coaxi to the appendices 13 and 16. Together with the pedest 8, the drum 18 constitutes the fixed support part of tl store 7, and comprises a cylindrical side wall 19, tl outer surface of which is provided with a helical groov 20 of substantially rectangular cross-section, whic terminates upperly at an annular shoulder 21 defining a end portion 22 of the drum 18 of narrow cross-sectior As shown in FIG. 2, a tubular member 23 is rigidl connected to the pedestal 8, and extends upwards on tl outside of the appendix 13, to comprise at its top a external annular flange 24 to which an annular plate 2 is rigidly connected, which is coaxial to the appendix 1 and is disposed at the same level as the lower end of tl drum 18 and on the outside thereof.

A movable part is coupled to said fixed support pa of the store 7, and comprises two rings 26 and 27, eac comprising an internal toothing 28, and disposed : opposite ends of the drum 18 in a position coaxi thereto.

Each ring 26, 27 comprises an intermediate annuli plate 29 disposed facing the relative end of the wall 1 of the drum 18, and two cylindrical walls 30 and 3 extending in opposite directions from the inner peripl ery and outer periphery respectively of the plate 29 an coaxial to the wall 19. The wall 30 extends within tl wall 19, and carries at its end the internal toothing 2 whereas the wall 31 is disposed in a position substai tially aligned with the relative end of the wall 19, and limited externally by a cylindrical surface 32 (FIG. 3 the diameter of which is slightly greater than the out diameter of the wall 19.

The rings 26 and 27 are rigidly connected together t a plurality of rods 33 of rectangular cross-section ha ing their axis substantially parallel to the axis of tl

3

...um 18, and extending on the outside of the wall 19 so ...to substantially cover it, they being connected by end ...ews 34 to the surface 32 of each of the rings 26 and...

Figure 3:
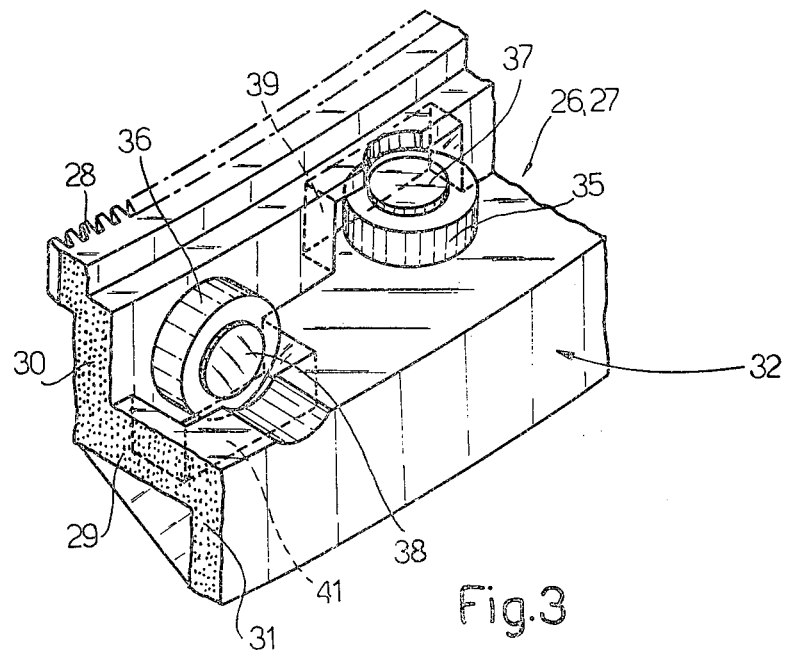

As shown in FIG. 3, each ring 26, 27 is coupled in a ...atable but axially fixed manner to the wall 19 of the ...im 18 by two sets of rollers 35 and 36, the first of ...ich are rotatably mounted on respective pins 37 of ...tical axis carried by the plate 29, while the second ...rotatably mounted on respective pins 38 extending ...ially outwards from the cylindrical wall 30. Each ...ler 35 engages, by way of part of its periphery, in a ...pective cavity 39 provided in the wall 30, and is ...anged to roll in contact with a respective cylindrical ...ck 40 (FIG. 2) coaxial to the drum 18 and provided ...the inner surface of the wall 19 at one end thereof. ...ch roller 36 engages, by way of part of its periphery, ...a respective cavity 41 provided in the wall 29, and is ...anged to roll in contact with a respective annular ...ck 42 (FIG. 2) coaxial to the drum 18 and provided ...one end of the wall 19.

Although in practice the rollers 36 are mounted on ...th the rings 26 and 27, the rollers 36 of the ring 27 ...ild also be dispensed with, in that the rollers 36 of the ...g 26 are sufficient by themselves to ensure that the ...embly consisting of the two rings 26 and 27 and rods ...rests on the drum 18.

As shown in FIG. 2, said movable part 26, 27, 33 is ...anged to be rotated, with respect to the fixed drum ...by means of a drive device indicated overall by 43 ...1 comprising a drive shaft 44 with its axis parallel to ...axis of the drum 18 and connected angularly to a ...ersible motor, not shown. A gear wheel 45 is keyed ...to the shaft 44, and engages with a gear wheel 46 ...yed on to a second shaft 47. This latter extends rotat...y, by way of bearings 48, through two coaxial bores ...and 50 having their axis parallel to the axis of the ...im 18, the former being provided through a ledge 51 ...ending radially inwards from the wall 19, and the ...ter through the wall 17.

Two further gear wheels 52 and 53 are keyed on to ...shaft 47, and engage with the internal toothings 28 ...the rings 26 and 27 respectively.

A band 54 preferably constituted of a resilient mate...l such as plastics or spring steel and wound in the ...m of a cylindrical helix having an internal diameter ...ghtly greater than the diameter of the recessed por...n 22 and the base diameter of the groove 20, is cou...d to the movable part 26, 27, 33.

The band 54 is coupled angularly to the rods 33 by ...ans of a plurality of through bores 55 (FIG. 4) ...ough which the rods 33 slidably extend, and which ...disposed in such a manner as to enable each rod 33 ...pass through all the superposed turns of the band 54. ...his latter is wound around the drum 18 and with ...pect to this latter is able to assume any position be...een a "zero capacity" position shown in FIG. 2 and ...maximum capacity" position, not shown.

In the "zero capacity" position, the turns of the band ...are wound in the form of a pack around the recessed ...tion 22 of the drum 18, and are contained within a ...verly open annular compartment 56 defined inter...ly by the recessed portion 22, and upperly and exter...ly by a cap 57 which is rigid with the drum 18 and ...nprises an outer annular flange 58 extending out...rds from the drum 18, and rigid at its outer periphery ...h a cylindrical wall 59 facing the recessed portion 22 ...l coaxial therewith. In the said "zero capacity" posi-

Figure 4:
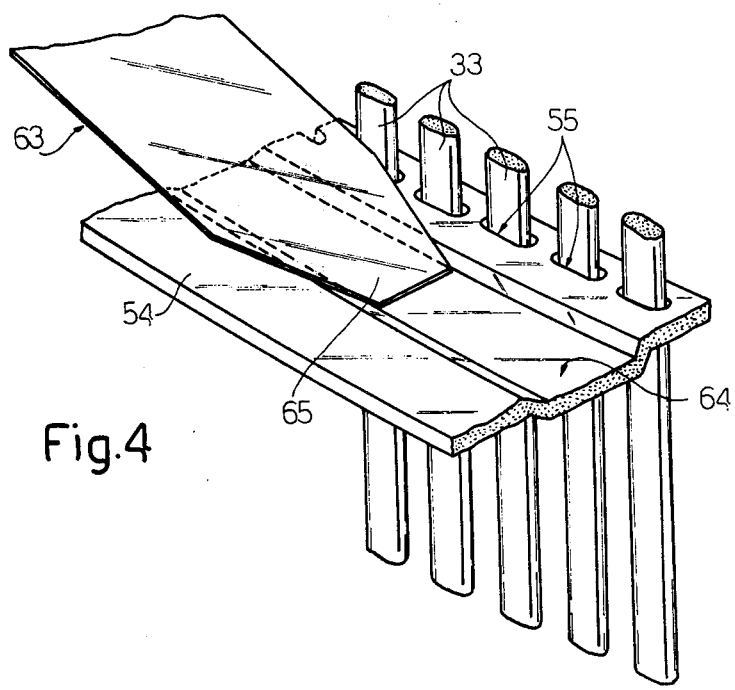
FIGS. 3 and 4 are perspective views showing tv details of FIG. 2 to an enlarged scale.

4 tion, only a part of the lower turn of the band 54 extends below the recessed portion 22, and slidably engages in a corresponding portion of the upper turn of the helical groove 20, so that its free end, to which an orthogonal wall 60 is rigidly connected, becomes disposed downstream of a loading-unloading station 61. This latter comprises a belt conveyor 62 extending in a direction substantially tangential to the drum 18, and inclined downwards to a greater degree than the groove 20, and a plate 63 to provide a connection between the end of the conveyor 62 and the band 54. As shown in FIG. 4, in order to ensure stable coupling between the plate 63 and band 54, this latter is provided with a longitudinal groove 64 in which a tapered end portion 65 of the plate 63 slidably engages.

In the said "maximum capacity" position (not shown), the band 54 is disposed with its turns slidably engaged in all the turns of the groove 20.

In this respect, the lower turn of the band 54 is in contact with the upper surface of the annular plate 25, and the upper turn of the band 54 is disposed with its free end immediately upstream of station 61.

When in use, the storage unit 5 begins to operate as soon as control means, not shown but of known type, detect a difference between the number of cigarettes fed through the channel 3 to the hopper 2 and the number of cigarettes absorbed by the packaging machine 1.

If the rate of absorption of the machine 1 is less than the production rate of said forming machines connected to it by means of the feed unit 4, the belt 62, which forms the base wall of the inlet duct 6 to the unit 5, is operated so as to take from the channel 3 the quantity of cigarettes in excess of the quantity absorbed by the machine 1, and feed this quantity to the plate 63. Simultaneously, the drive shaft 44 is operated to rotate said movable part 26, 27, 33, 54 which tends to withdraw the wall 60 rigid with the band 54, from the plate 63. This withdrawal movement takes place because the said rotation of the drive shaft 44 and the consequent rotation of the rings 26 and 27 and of the rods 33 produces a corresponding sliding of the band 54 along the groove 20, with simultaneous axial sliding of the band 54 along the rods 33 which bind it angularly to the rings 26 and 27.

In this manner, the cigarettes (not shown) disposed on the belt 62 in lateral contact with each other, at least over one layer and positioned transversely to the direction of forward movement of the belt 62, are unloaded on to the band 54, by way of the plate 63, as the band, running along the helical groove 20, unwinds downstream of the station 61 towards the plate 25.

However, if the production rate of said forming machines is less than the absorption rate of machine 1 and the channel 3 therefore tends to become empty, the belt 62 is driven so as to feed channel 3 with the necessary quantity of cigarettes to compensate for the insufficient production of said forming machines. This quantity of cigarettes is unloaded on to the belt 62 from the store 7, the drive shaft 44 of which is operated to rotate said mobile part 26, 27, 33, 54 such as to tend to reduce the length of band 54 lying between the wall 60 and station 61.

From the aforegoing description, it can be seen that the store 7 can be viewed diagrammatically as an assembly of two elements, the first of which is constituted substantially by a fixed support member, and the second is constituted substantially by a helical container wound about said fixed support member and coupled to it by a screw-nut screw coupling, and in which that part of said container occupied by the elements to be stored varies as the position assumed by the nut screw, constituted by said helical container, varies in position relative to the central screw constituted by said fixed member.

Without leaving the scope of the inventive idea, a modification of the store 7 of FIG. 2 could be constructed (not shown), using a band similar to the helical band 54, but rigid. However, it should be noted that the embodiment shown in the figures is certainly preferable because the use of a rigid band would mean that the store, when in said "zero capacity" state, has a total height which is substantially double the height of the illustrated embodiment. In this respect, the use of the resilient band 54 (i.e. forming a helical spring) and the compartment 56 means that axial movement of the band 54 above the drum 18 is prevented, and causes those turns of the band 54 which are not used for supporting cigarettes to be squeezed into a pack so as to reduce to a minimum the overall vertical size of the variable capacity store thus constructed.

What we claim is:

1. A variable capacity reservoir for rod shaped articles, particularly cigarettes, comprising:
   a vertically upstanding fixed member;
   a movable helical band for supporting said rod shaped articles; wherein said helical band has a free end and is formed of a resilient material;
   said band is collapsed at zero storage capacity and is expanded along said vertically upstanding fixed member at maximum capacity.
   engaging means between said helical band and said fixed member enabling said helical band to rotate helically in engagement with said fixed member;
   reversible drive means for rotating said helical band in respective rotational directions with respect to said fixed member; and
   means for transferring said rod shaped articles to and from said helical band as said helical band is rotated in respective rotational directions.

2. A reservoir as claimed in claim 1, wherein said engaging means includes a helical groove in said fixed member, and said helical band having an inner periphery slidably engaged with said helical groove.

3. A variable capacity reservoir for rod shaped articles, particularly cigarettes, comprising:
   a substantially cylindrical vertically upstanding fixed member having an external helical groove;
   a helical band rotatable with respect to said fixed member for supporting said rod shaped articles;
   said helical band including a free end, and an inner perimeter slidably engageable with said helical groove in said fixed member as said helical band rotates around said fixed member;
   reversible drive means for rotating said helical band with respect to said fixed member, said drive means including:
   a plurality of substantially vertical, rotatably driven rod members adapted for bidirectional rotational movement around said fixed member, including means coupling said rod members in driving engagement with said helical band;
   a loading-unloading station for said rod shaped articles disposed in a fixed position with respect to said fixed member and including means for transferring said rod shaped articles to and from said helical band as said helical band is rotated in respective rotational directions; and
   said helical band free end disposed in said helical groove adjacent said loading-unloading station to define a position of substantially zero capacity for said reservoir and slidably disposed in said helical groove remotely from said loading-unloading station to define a position of maximum capacity for said reservoir.

4. A variable capacity reservoir for rod shaped articles, particularly cigarettes, according to claim 3, wherein said plurality of substantially vertical rod members define a cylindrical cage surrounding said upstanding fixed member, and said helical band inner perimeter includes a plurality of apertures, each having a respective rod passing therethrough to provide said driving engagement.

5. A variable capacity reservoir for rod shaped articles, particularly cigarettes, according to claim 3, wherein said helical band is formed of a resilient material and is collapsible and expandable along the helical axis.

6. A variable capacity reservoir for rod shaped articles, particularly cigarettes, according to claim 5, including means for mounting said helical band in collapsed form at the upper end of said vertically upstanding fixed member.

7. A variable capacity reservoir for rod shaped articles, particularly cigarettes, according to claim 3, wherein said helical band includes a recessed portion therein for supporting said rod shaped articles in substantial radial alignment with said cylindrical fixed member.

* * * * *